United States Patent
Kim

(10) Patent No.: US 9,896,794 B2
(45) Date of Patent: *Feb. 20, 2018

(54) DRIVING APPARATUS FOR DIRECT-DRIVE TYPE WASHING MACHINE

(71) Applicant: AMOTECH CO., LTD., Incheon (KR)

(72) Inventor: Byung Soo Kim, Anyang-si (KR)

(73) Assignee: AMOTECH CO., LTD., Incheon (KR)

( * ) Notice: Subject to any disclaimer, the term of this patent is extended or adjusted under 35 U.S.C. 154(b) by 852 days.

This patent is subject to a terminal disclaimer.

(21) Appl. No.: 14/097,495

(22) Filed: Dec. 5, 2013

(65) Prior Publication Data

US 2014/0091662 A1    Apr. 3, 2014

Related U.S. Application Data

(63) Continuation-in-part of application No. PCT/KR2012/004445, filed on Jun. 5, 2012.

(30) Foreign Application Priority Data

Jun. 8, 2011    (KR) .................. 10-2011-0055083

(51) Int. Cl.
*D06F 37/30* (2006.01)
*D06F 17/08* (2006.01)
(Continued)

(52) U.S. Cl.
CPC ............ *D06F 37/304* (2013.01); *H02K 7/14* (2013.01); *H02K 16/00* (2013.01); *D06F 17/08* (2013.01); *D06F 23/04* (2013.01); *D06F 37/40* (2013.01)

(58) Field of Classification Search
CPC ...... H02K 16/00; H02K 16/02; H02K 16/025; H02K 11/30; H02K 11/33; H02K 11/35;
(Continued)

(56) References Cited

U.S. PATENT DOCUMENTS 3,194,032 A * 7/1965 Von Brimer .......... D06F 37/307
310/13
6,257,027 B1* 7/2001 Imai ...................... D06F 37/304
68/12.12

(Continued)

FOREIGN PATENT DOCUMENTS

JP    2007060828    3/2007
KR    100438616    6/2004
(Continued)

OTHER PUBLICATIONS

International Search Report—PCT/KR2012/004445 dated Nov. 14, 2012.

*Primary Examiner* — Quyen Leung
*Assistant Examiner* — Minki Chang
(74) *Attorney, Agent, or Firm* — Cantor Colburn LLP

(57) ABSTRACT

A driving apparatus for a direct-drive type washing machine includes a support member that is fixed to the lower side of a washing tub; a dehydrating tub rotating shaft that is rotatably supported on the support member and that is connected to a dehydrating tub to rotate the dehydrating tub; a pulsator rotating shaft that is rotatably arranged in the inside of the dehydrating tub rotating shaft and that is connected to a pulsator to rotate the pulsator; a drive motor comprising a double rotor including an outer rotor that is connected to the pulsator rotating shaft and an inner rotor that is connected to the dehydrating tub rotating shaft, and a double stator including a first stator coil for rotating the outer rotor and a second stator coil for rotating the inner rotor; and a motor drive unit that generates alternating-current (AC) power according to a washing control signal.

6 Claims, 11 Drawing Sheets

(51) Int. Cl.
  *D06F 37/40* (2006.01)
  *H02K 16/00* (2006.01)
  *H02K 7/14* (2006.01)
  *D06F 23/04* (2006.01)

(58) Field of Classification Search
  CPC ....... H02K 11/38; D06F 37/30; D06F 37/304;
       D06F 37/306; D06F 37/32; D06F 37/34;
       D06F 37/36; D06F 37/38; D06F 37/40;
         A47L 15/00; A47L 15/0018; A47L
                           15/0021
  USPC ...... 310/114, 68 D, 266; 68/11, 12.16, 12.17
  See application file for complete search history.

(56) References Cited

U.S. PATENT DOCUMENTS

| | | | |
|---|---|---|---|
| 7,626,299 B2 | 12/2009 | Yoshikawa et al. | |
| 9,392,925 B2* | 7/2016 | Kim | A47L 15/0018 |
| 2010/0050702 A1* | 3/2010 | Kim | D06F 37/307 |
| | | | 68/23 R |
| 2010/0181862 A1* | 7/2010 | Krauth | H02K 1/165 |
| | | | 310/198 |
| 2013/0160499 A1* | 6/2013 | Kim | A47L 15/0018 |
| | | | 68/12.16 |

FOREIGN PATENT DOCUMENTS

| | | |
|---|---|---|
| KR | 1020080064317 | 7/2008 |
| KR | 1020090074132 | 7/2009 |

* cited by examiner

DRIVING APPARATUS FOR DIRECT-DRIVE TYPE WASHING MACHINE

CROSS REFERENCE TO RELATED APPLICATIONS

This application is a continuation-in-part application of PCT Application No. PCT/KR2012/004445, filed on Jun. 5, 2012, which claims priority to and the benefit of Korean Application No. 10-2011-0055083 filed on Jun. 8, 2011, the entire contents of which are incorporated herein by reference.

TECHNICAL FIELD

The present invention relates to a driving apparatus for a direct-drive type washing machine in which a dehydrating tub and a pulsator can be rotated in respectively different directions.

BACKGROUND ART

In general, as shown in FIG. 1, a direct-drive type washing machine is configured to include: a casing 100 forming an external appearance; a washing tub 102 that is supported in the inside of the casing 100 and that accommodates water; a dehydrating tub 104 that is rotatably arranged in the inside of the washing tub 102, to perform washing and dehydration; a pulsator 106 that is secured on the bottom of the dehydrating tub 104 to form a washing stream of water; and a driving apparatus 110 that is arranged on the lower portion of the casing 100 to drive the dehydrating tub 104 and the pulsator 106.

A conventional driving apparatus 110 for the direct-drive type washing machine is configured to include: a dehydrating tub rotating shaft 114 that is connected with the dehydrating tub 104 to rotate the dehydrating tub 104 and is formed in a hollow form; a pulsator rotating shaft 112 that is connected with the pulsator 106 to rotate the pulsator 106 and that is arranged in a mutually concentric form in the inside of the dehydrating tub rotating shaft 114; a clutch device 130 that controls rotations of the dehydrating tub rotating shaft 114 and the pulsator rotating shaft 112, during performing washing or dehydration; a drive motor 150 that generates torque of the dehydrating tub rotating shaft 114 and the pulsator rotating shaft 112; and a clutch actuator 140 controlling operation of the clutch device 130.

The function and operation of the conventional direct-drive type washing machine as constructed above will follow.

At a washing cycle, water is supplied to the inside of the washing tub 102, and if the drive motor 150 is driven, the pulsator rotating shaft 112 is rotated, and the pulsator 106 is rotated, to thus form a stream of water in the dehydrating tub 104 in order to wash laundry. Here, the dehydrating tub rotating shaft 114 is constrained by the clutch device 130 and thus is not rotated.

If washing is completed, a water drain pump is driven to perform drainage of water, and the dehydrating tub 104 and the pulsator 106 are rotated at the same time, rinsing and dehydration is repeatedly carried out.

Here, in the case that the dehydrating tub 104 is made to rotate, the clutch actuator 140 is activated and then the clutch device 130 is actuated, to thus deliver the torque of the drive motor 150 to both the dehydrating tub rotating shaft 114 and the pulsator rotating shaft 112 at the same time.

However, the conventional direct-drive type washing machine needs a clutch and a clutch actuator for activating the clutch, in order to deliver the torque of the drive motor 150 to both or one of the dehydrating tub rotating shaft 114 and the pulsator rotating shaft 112, to thereby cause manufacturing costs to be increased and the structure to be complicated.

In addition, in the case of the conventional direct-drive type washing machine, the pulsator and the dehydrating tub are not rotated in the respectively different directions, to thus cause the poor performance of the washing machine.

Korea Patent Registration No. 10-0438616 discloses a conventional direct-drive type washing machine having a clutch in order to rotate only a pulsator, or to rotate both a pulsator and a dehydrating tub, by using a single motor for the washing machine.

The clutch delivers torque of the motor for the washing machine to the pulsator rotating shaft, to thus rotate the pulsator, or delivers the torque of the motor for the washing machine to both the pulsator rotating shaft and the dehydrating tub rotating shaft, to thus rotate both the pulsator and the dehydrating tub simultaneously at high-speed.

However, the clutch includes a coupling, a coupling lifting lever, and a lifting lever driver, and also includes a torque transmission unit having a sun gear, a planetary gear, and a carrier, in order to deliver torque of the rotor to the pulsator during washing, to thus cause a very complex configuration and an expensive manufacturing cost.

SUMMARY OF THE INVENTION

To solve the above problems or defects, it is an object of the present invention to provide a driving apparatus for a direct-drive type washing machine in which an existing clutch and an existing clutch actuator can be removed to thus reduce manufacturing costs and simplify manufacturing processes and to thereby reduce overall height of the washing machine.

It is another object of the present invention to provide a driving apparatus for a direct-drive type washing machine in which a dehydrating tub and a pulsator can be rotated in respectively different directions, to thus improve performance of the washing machine.

It is still another object of the present invention to provide a driving apparatus for a direct-drive type washing machine in which a pulsator and a dehydrating tub are selectively rotated by using a motor for use in the washing machine having a double rotor and a double stator without using a separate clutch, to thus wash laundry.

It is yet another object of the present invention to provide a driving apparatus for a direct-drive type washing machine in which a dehydrating tub is rotated in same direction as or in the opposite direction to that of a pulsator in the case that the pulsator is rotated to thus perform a washing or rinsing operation of laundry, to thereby improve efficiency of washing the laundry.

It is still yet another object of the present invention to provide a driving apparatus for a direct-drive type washing machine in which a pulsator and a dehydrating tub are selectively rotated by using a motor for use in the washing machine having a double rotor and a double stator as a motor driver unit.

The objects of the present invention are not limited to the above-described objects, and other objects and advantages of the present invention can be clearly appreciated from the following description by those of ordinary skill in the art in a technological field to which the present invention belongs.

To accomplish the above and other objects of the present invention, according to an aspect of the present invention, there is provided a driving apparatus for a direct-drive type washing machine, the driving apparatus comprising: a support member that is fixed to the lower side of a washing tub; a dehydrating tub rotating shaft that is rotatably supported on the support member and that is connected to a dehydrating tub to rotate the dehydrating tub; a pulsator rotating shaft that is rotatably arranged in the inside of the dehydrating tub rotating shaft and that is connected to a pulsator to rotate the pulsator; a drive motor comprising a double rotor including an outer rotor that is connected to the pulsator rotating shaft and an inner rotor that is connected to the dehydrating tub rotating shaft, and a double stator including a first stator coil for rotating the outer rotor and a second stator coil for rotating the inner rotor; and a motor drive unit that generates alternating-current (AC) power according to a wash control signal to control the AC power to be applied to the first and second stator coils.

Preferably but not necessarily, the driving apparatus for a direct-drive type washing machine further comprises a first rotor drive controller that is set to block or pass an application of the AC power to the second stator coil under the control of the motor driver unit, to thus control driving of the inner rotor.

Preferably but not necessarily, the first rotor drive controller is set to block an application of the AC power to the second stator coil at a washing mode, and is set to pass an application of the AC power to the second stator coil at a dehydrating mode.

Preferably but not necessarily, the AC power is formed of three-phase AC power, and the first rotor drive controller comprises: three main switches that are respectively provided between the three-phase AC power and the second stator coil, and that blocks or passes the three-phase AC under the control of the motor drive unit; and two auxiliary connection units that alter paths of two-phase AC power of the three-phase AC power of being applied to the second stator coil, to thereby alter a rotating direction of the inner rotor at the time of driving the inner rotor.

Preferably but not necessarily, the AC power is formed of three-phase AC power, and the first rotor drive controller is controlled to pass one phase of the three-phase AC power that is applied to the second stator coil and to alter paths of two phases of the three-phase AC power in the case of performing a washing or rinsing mode, so that the inner rotor rotates in the opposite direction to that of the outer rotor.

Preferably but not necessarily, the driving apparatus for a direct-drive type washing machine further comprises a second rotor drive controller that is provided between the motor drive unit and the first stator coil, and that is set to block or pass an application of the AC power to the first stator coil under the control of the motor driver unit, to thus control driving of the outer rotor.

Preferably but not necessarily, the motor drive unit comprises: a motor controller that generates a drive signal according to the wash control signal to control driving of the drive motor; and an inverter that generates AC power under the control of the motor controller and outputs the AC power to the first stator coil for rotating the outer rotor in the drive motor, and to the second stator coil for rotating the inner rotor in the drive motor.

Preferably but not necessarily, an application of the AC power to the second stator coil is blocked at a washing or rinsing mode, so as to control the inner rotor and the dehydrating tub to be prevented from rotating.

Preferably but not necessarily, the double stator comprises: a stator core having a plurality of inner teeth formed inwards, and a plurality of outer teeth formed outwards; first coils that are wound around the inner teeth; and second coils that are wound around the outer teeth.

Preferably but not necessarily, the stator core comprises: a ring-shaped body that is formed in a ring shape; the inner teeth that are radially formed on the inner surface of the body; and the outer teeth that are radially formed on the outer surface of the body.

Preferably but not necessarily, the double stator comprises: a plurality of split cores that are assembled in an annular form, and each split core has outer teeth formed outwards, and inner teeth formed inwards; a plurality of insulator bobbins that surround the outer surfaces of the plurality of split cores, respectively; first stator coils that are wound on the outer teeth; and second stator coils that are wound on the inner teeth.

According to another aspect of the present invention, there is also provided a driving apparatus for a direct-drive type washing machine, the driving apparatus comprising: a support member that is fixed to the lower side of a washing tub; a dehydrating tub rotating shaft that is rotatably supported on the support member and that is connected to a dehydrating tub to rotate the dehydrating tub; a pulsator rotating shaft that is rotatably arranged in the inside of the dehydrating tub rotating shaft and that is connected to a pulsator to rotate the pulsator; a drive motor comprising a double rotor including an outer rotor that is connected to the pulsator rotating shaft and an inner rotor that is connected to the dehydrating tub rotating shaft, and a double stator including a first stator coil for rotating the outer rotor and a second stator coil for rotating the inner rotor; an inverter that generates AC power to then be applied to the first and second stator coils; a first rotor drive controller that is provided between the inverter and the second stator coil, and that is set to block, pass, or path-change an application of the AC power to the first stator coil, to thus control driving of the outer rotor; and a second rotor drive controller that is provided between the inverter and the second stator coil, and that is set to block or pass an application of the AC power to the second stator coil, to thus control driving of the inner rotor.

Preferably but not necessarily, the first and second stator coils are excited by the first and second rotor drive controllers in the case that an operation mode of the washing machine is a washing or rinsing mode, to thus rotate the outer and inner rotors of a drive motor in respectively different directions and to thus rotate a pulsator and a dehydrating tub in respectively different directions, and the inner rotor of the drive motor is rotated by the first and second rotor drive controllers in the case that the operation mode is a dehydrating mode, to thus rotate the dehydration tub.

Preferably but not necessarily, the first and second rotor drive controllers comprise three switches, relays or switching circuits so as to apply or block three-phase AC power.

Preferably but not necessarily, the AC power is formed of three-phase AC power, and the first rotor drive controller comprises: three main switches that are respectively provided between the three-phase AC power and the second stator coil, and that blocks or passes the three-phase AC under the control of the motor drive unit; and two auxiliary connection units that alter paths of two-phase AC power of the three-phase AC power of being applied to the second stator coil, to thereby alter a rotating direction of the inner rotor at the time of driving the inner rotor.

As described above, in the case of a driving apparatus for a direct-drive type washing machine according to the present invention, an inner rotor is connected to a dehydrating tub rotating shaft, and an outer rotor is connected to a pulsator rotating shaft. Accordingly, a pulsator and a dehydrating tub can be selectively driven without having a clutch or a clutch actuator, to thus simplify manufacturing processes, reduce the manufacturing costs, and reduce the height of the washing machine.

In addition, in the case of a driving apparatus for a direct-drive type washing machine according to the present invention, an inner rotor is connected to a dehydrating tub rotating shaft, and an outer rotor is connected to a pulsator rotating shaft. Accordingly, a dehydrating tub and a pulsator can be rotated in respectively different directions, to thus improve performance of the washing machine.

Furthermore, a driving apparatus for a direct-drive type washing machine according to the present invention may rotate a pulsator and a dehydrating tub selectively, by using a motor for use in the washing machine having a double rotor and a double stator, without using a separate clutch, in order to wash laundry.

The present invention rotates a pulsator in order to perform a wash or rinse operation of laundry, in which case a dehydrating tub is rotated in the same as or opposite direction to that of the pulsator, to thus improve washing efficiency of laundry.

The present invention can selectively drive a pulsator and a dehydrating tub by using a motor for use in the washing machine having a double rotor and a double stator, and a single motor drive unit.

DETAILED DESCRIPTION OF THE INVENTION

Figure 1:
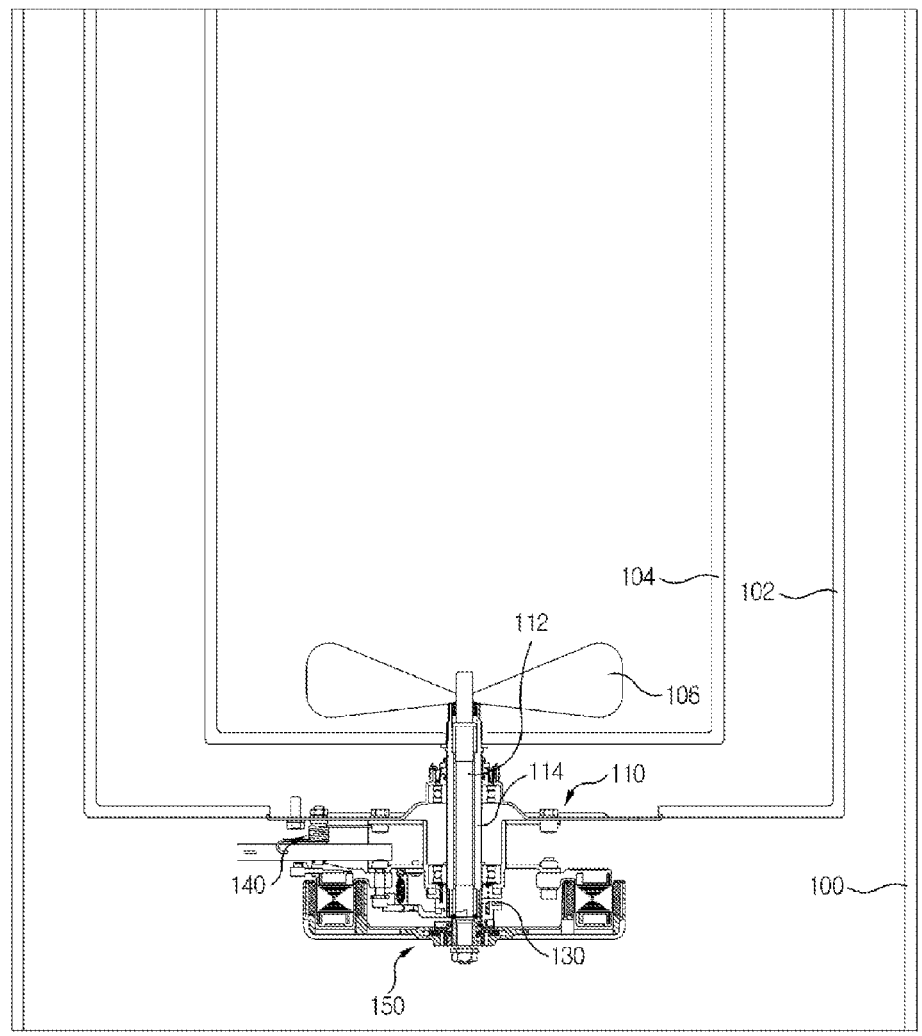
FIG. 1 is a cross-sectional view of a conventional direct-drive type washing machine.

Hereinafter, a driving apparatus for a direct-drive type washing machine according to a preferred embodiment of the present invention will be described in detail with reference to the accompanying drawings. In this specification, the size and the shape of the components in the drawings may be exaggerated for clarity and convenience of explanation. In addition, the terms that are specifically defined by considering the configuration and operation of the present invention may vary according to user's or operator's intentions or customs. The definitions of these terms shall be made on the basis of the content throughout this specification.

Figure 2:
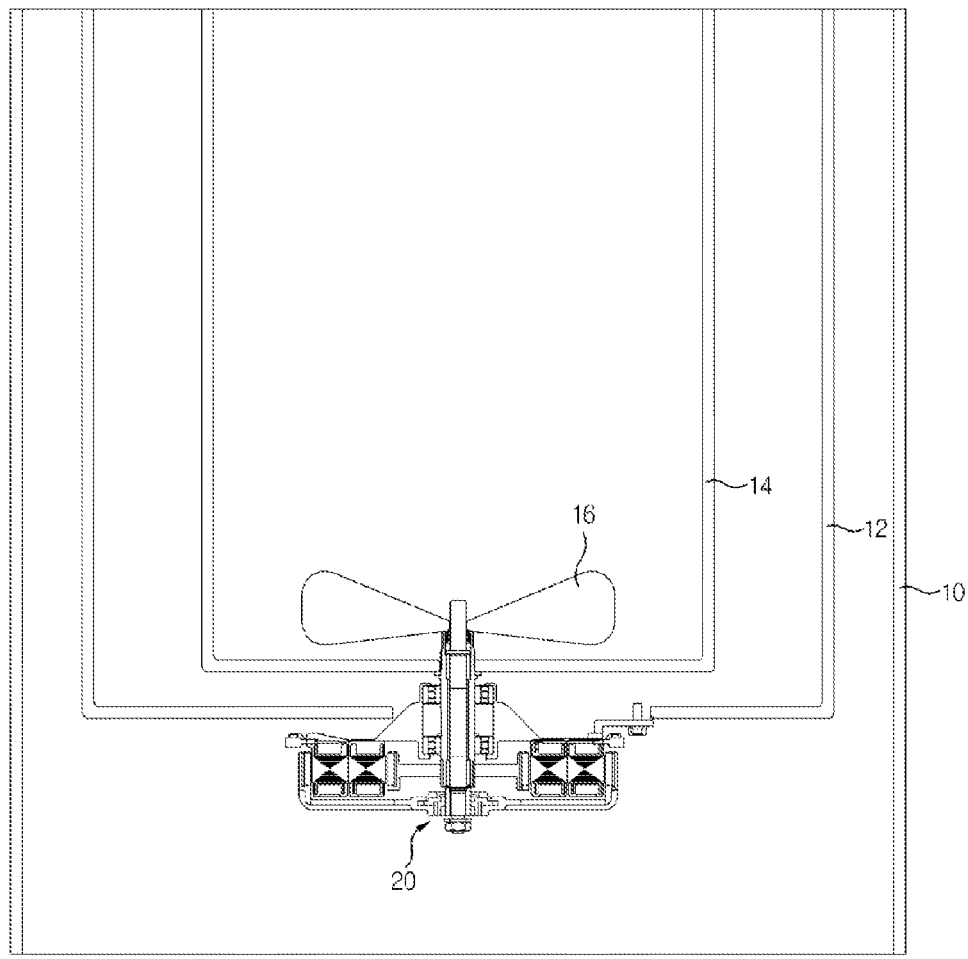
FIG. 2 is a cross-sectional view of a direct-drive type washing machine according a first embodiment of the present invention.

FIG. 2 is a cross-sectional view of a direct-drive type washing machine according a first embodiment of the present invention.

Referring to FIG. 2, a direct-drive type washing machine according an embodiment of the present invention is configured to include: a casing 10 forming an external appearance; a washing tub 12 that is suspended and supported in the inside of the casing 10 and that accommodates water; a dehydrating tub 14 that is rotatably arranged in the inside of the washing tub 12, to perform washing and dehydration; a pulsator 106 that is rotatably placed in the dehydrating tub 14 to form a washing stream of water; and a driving apparatus 20 that is arranged on the lower portion of the dehydrating tub 14 to drive the dehydrating tub 14 and the pulsator 16, simultaneously or selectively.

Figure 3:
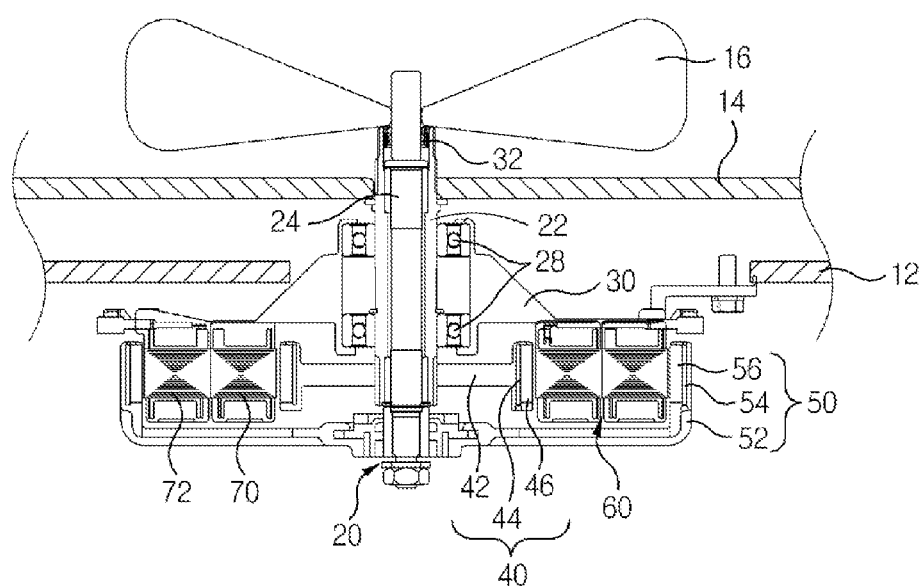
FIG. 3 is a cross-sectional view of a driving apparatus for the direct-drive type washing machine according the first embodiment of the present invention.

As shown in FIG. 3, the driving apparatus 20 includes a support member 30 that is fixed to the lower side of the washing tub 12; a dehydrating tub rotating shaft 22 that is rotatably supported on the support member 30 and that is connected to the dehydrating tub 14 to rotate the dehydrating tub 14; a pulsator rotating shaft 24 that is rotatably arranged in the inside of the dehydrating tub rotating shaft 22 and that is connected to a pulsator 16 to rotate the pulsator 16; an inner rotor 40 that is connected to the dehydrating tub rotating shaft 22; an outer rotor 50 that is connected to the pulsator rotating shaft 24; and a double stator 60 that is arranged with an air gap between the inner rotor 40 and the outer rotor 50.

The inner rotor 40, the outer rotor 50, and the double stator 60 that is arranged with an air gap between the inner rotor 40 and the outer rotor 50, form a motor.

The dehydrating tub rotating shaft 22 is formed to have a hollow shape. The top portion of the dehydrating tub rotating shaft 22 is fixed to the dehydration tub 14 and bearings 28 are disposed between the center of the dehydrating tub rotating shaft 22 and the support member 30. Accordingly, the dehydrating tub rotating shaft 22 is rotatably supported on the support member 30. The bottom of the dehydrating tub rotating shaft 22 is spline-coupled to the inner rotor 40. Accordingly, when the inner rotor 40 is rotated, the dehydrating tub rotating shaft 22 is rotated together.

The pulsator rotating shaft 24 is rotatably supported in the inside of the dehydrating tub rotating shaft 22. The pulsator 16 is fixed to the top of the pulsator rotating shaft 24, and the bottom of the pulsator rotating shaft 24 is spline-coupled to the outer rotor 50. Accordingly, when the outer rotor 50 is rotated, the pulsator rotating shaft 24 is rotated together.

A sealing member 32 is provided between the dehydrating tub rotating shaft 22 and the pulsator rotating shaft 24, to thereby prevent water filled in the inside of the dehydration tub 14 from leaking.

The inner rotor 40 includes: a first rotor support 42 that is connected to the dehydrating tub rotating shaft 22; a first back yoke 44 that is fixed to an outer surface of the rotor support 42; and a first magnet 46 that is mounted on the outer surface of the first back yoke 44 and that is arranged to face the double stator 60 with an air gap from an inner surface of the double stator 60.

The first rotor support 42 is formed in a circular plate shape whose center portion is opened. The outer end of the first rotor support 42 is fixed to the first back yoke 44 and the first magnets 46, and the inner end thereof is spline-coupled with the dehydrating tub rotating shaft 22.

The first magnet 46 is preferably configured to have eight (8) magnet pieces whose magnetic poles are eight (8) in number, in which the N-poles and S-poles are alternately arranged in the circumferential direction.

The outer rotor 50 includes: a second rotor support 52 that is connected to the pulsator rotating shaft 24; a second back yoke 54 that is fixed to the second rotor support 52; and a second magnet 56 that is mounted on the inner surface of the second back yoke 54 and that is arranged to face the double stator 60 with an air gap from an outer surface of the double stator 60.

The second back yoke 54 and the second magnet 56 are fixed on one side of the second rotor support 52, and the other side of the second rotor support 52 is spline-coupled with the pulsator rotating shaft 24.

The second magnet 56 is preferably configured to have twelve (12) magnet pieces whose magnetic poles are twelve (12) in number, in which the N-poles and S-poles are alternately arranged in the circumferential direction.

Figure 4:
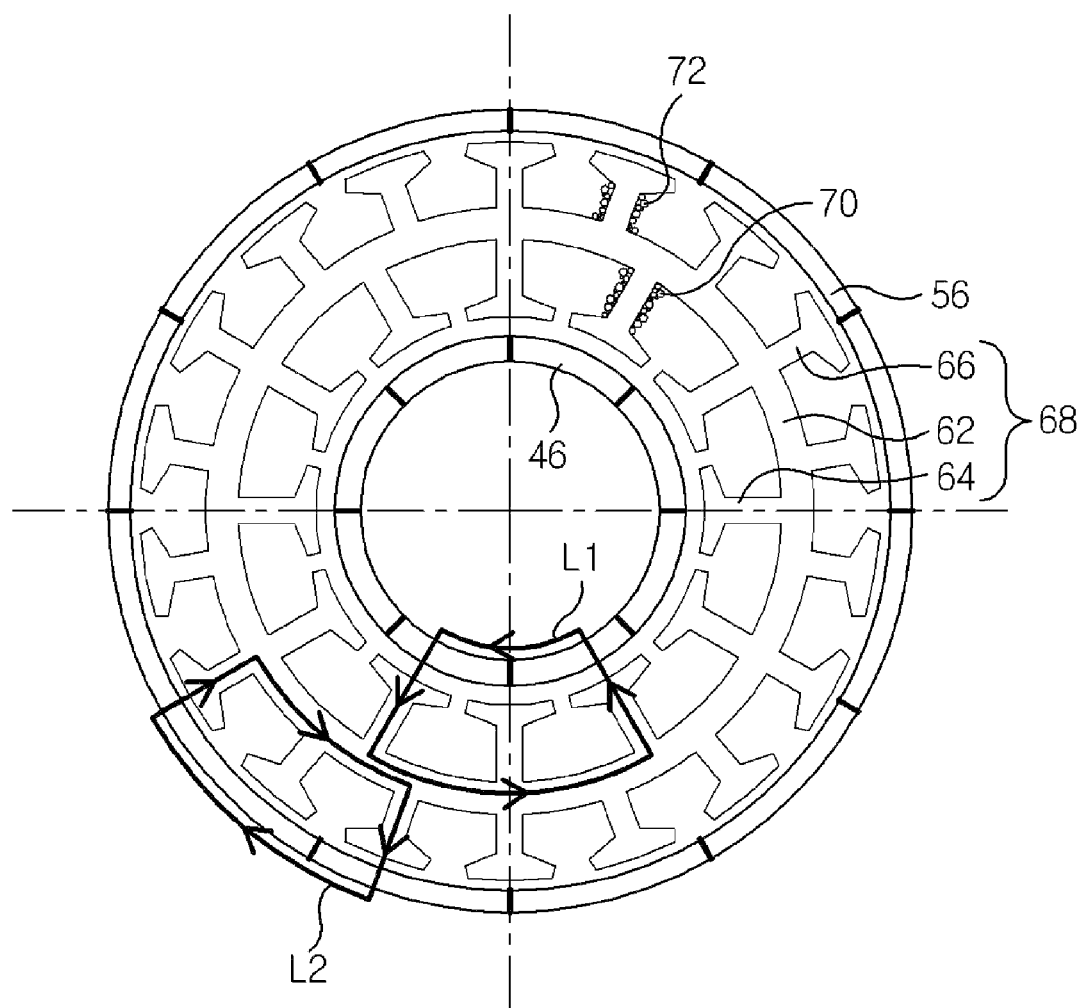
FIG. 4 is a plan view of a stator according to the first embodiment of the present invention.

As shown in FIG. 4, the double stator 60 includes: an integral stator core 68 whose inner side is disposed to face the inner rotor 40 and whose outer side is disposed to face the outer rotor 50; first coils 70 that are wound on the inside of the stator core 68; and a second coils 72 that are wound on the outside of the stator core 68.

Here, the stator core 68 includes: a ring-shaped body 62 that is formed of a ring shape; inner teeth 64 that are radially formed with a certain interval on the inner surface of the body 62 and around which inner coils that are the first coils 70 are wound; and outer teeth 66 that are radially formed with a certain interval on the outer surface of the body 62 and around which outer coils that are the second coils 72 are wound.

The top surface of the stator core 68 is fixed to the support member 30.

Here, since the body 62, the inner teeth 64 and the outer teeth 66 are integrally formed by a mold, the stator core 68 is made of a single component.

The number of the inner teeth 64 is twelve (12), and the number of the outer teeth 66 is eighteen (18). Here, the number of the inner teeth 64 and the number of the outer teeth 66 may vary depending on capacity of a motor.

Here, the number of the inner teeth 64 is different from the number of the outer teeth 66, so the three inner teeth 64 and the four outer teeth 66 are arranged to correspond with each other and are arranged in the same structure in the circumferential direction.

In other words, the two inner teeth 64 that are respectively positioned on both sides of the three inner teeth 64, are disposed to face the two outer teeth 66 that are respectively positioned on both sides of the four outer teeth 66, and the one inner stator tooth 64 that is positioned in the middle of the three inner teeth 64 is positioned between the two outer teeth 66.

The driving apparatus as constructed above forms a magnetic circuit L1 by the inner rotor 40, the inner teeth 64, and the first coil 70, and another magnetic circuit L2 by the outer rotor 50, the outer teeth 66, and the second coil 72.

That is, the first magnetic circuit L1 is formed to pass through the first magnet 46, the inner teeth 64 and the body 62, and thus if when electric power is applied to the first coil 70, the inner rotor 40 is rotated.

In addition, the second magnetic circuit L2 formed to pass through the second magnet 56, the outer teeth 66, and the body 62, and thus when electric power is applied to the second coil 72, the outer rotor 40 is rotated.

As described above, since the driving apparatus according to the first embodiment of the present invention is formed to have the first magnetic circuit L1 and the second magnetic circuit L2 separately, the inner rotor 40 and the outer rotor 50 work separately. Thus, when power is applied to the first coil 70, only the inner rotor 40 is rotated, and when power is applied to the second coil 72, only the outer rotor 50 is rotated, but when power is applied to both the first coil 70 and the second coil 72, the inner rotor 40 and the outer rotor 60 are rotated together.

The function of the direct-drive type washing machine according to the first embodiment of the present invention will follow.

First, when power is applied to the second coil 70, in order to drive only the pulsator 16 during washing, the outer rotor 50 rotates, and the pulsator 16 rotates while the outer rotor 50 and the pulsator rotating shaft 24 rotate.

In addition, when the pulsator 16 and the dehydrating tub 14 are rotated simultaneously during dehydration and rinsing, first and second drive signals are respectively applied to the first coil 70 and the second coil 72. Then, the inner rotor 40 rotates by the first magnetic circuit L1 and the dehydrating tub 14 is rotated while the dehydrating tub rotating shaft 22 associated with the inner rotor 40 is rotated. In addition, the outer rotor 50 rotates by the second magnetic circuit L2 and the pulsator 16 is rotated while the pulsator rotating shaft 24 associated with the outer rotor 50 is rotated.

In addition, when the pulsator 16 and the dehydrating tub 14 are rotated in the counter-directions to each other in order to remove loosening or tangling of laundry, the forward-direction first drive signal is applied to the first coil 70 and the reverse-direction the second drive signal is applied to the second coil 72.

Then, the inner rotor 40 and the outer rotor 50 rotate in the opposite directions to each other, and thus the pulsator 16 and the dehydrating tub 14 rotate in the opposite directions to each other.

Figure 5:
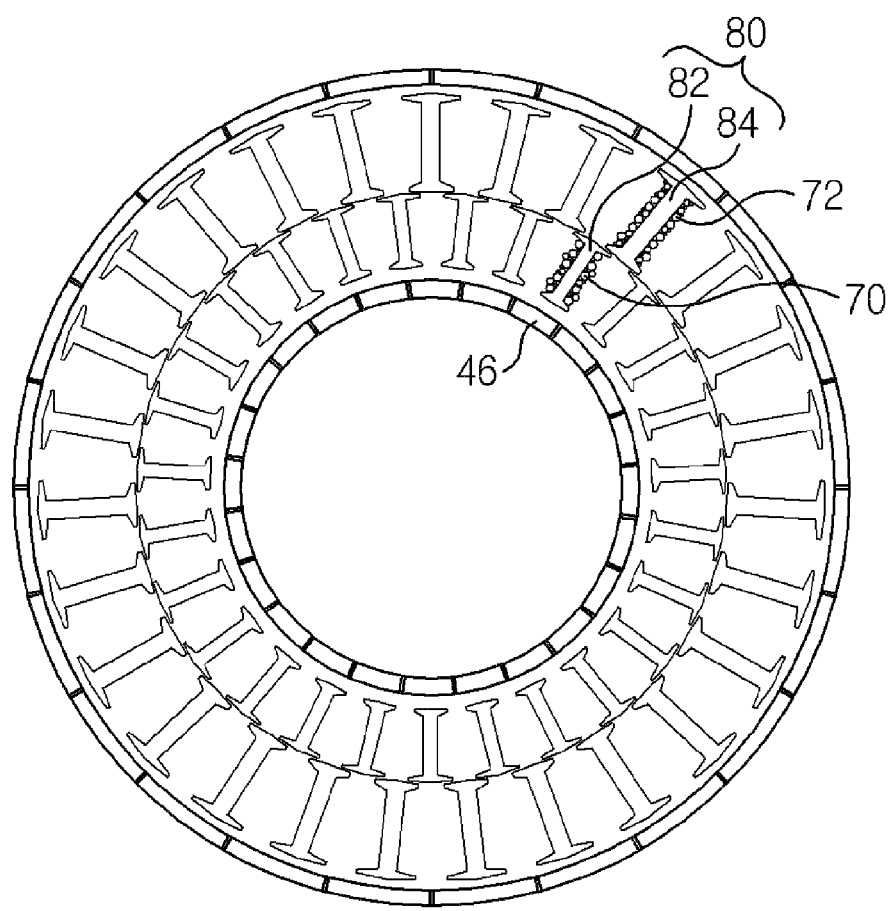
FIG. 5 is a plan view of a stator according to a second embodiment of the present invention.

FIG. 5 is a plan view of a stator of a driving apparatus for use in a direct-drive type washing machine according to a second embodiment of the present invention.

The direct-drive type washing machine in accordance with the second embodiment of the present invention has the driving apparatus of the same structure as that of the first embodiment of the present invention, but has a stator 80 of a different structure from that of the first embodiment of the present invention.

The stator 80 according to the second embodiment of the present invention, includes: inner stator cores 82 around which the first coils 70 are wound and that are disposed to face the first magnet 46 of the inner rotor 40, with an air gap; and outer stator cores 84 that are arranged in the circumferential direction in the outer side of the inner stator cores 82, around which the second coils 72 are wound, and that are disposed to face the second magnet 56 of the outer rotor 50, with an air gap.

In other words, the stator 80 according to the second embodiment of the present invention is divided into the inner stator cores 82 around which the first coils 70 are wound, and the second stator cores 84 around which the second coils 72 are wound, in which the two stator cores 82 and 84 remain mechanically interconnected.

It is preferable that the number of the inner stator cores 82 is the same as that of the outer stator cores 84. One outer stator core 84 is arranged between two inner stator cores 82.

In other words, the inner stator cores 82 and the outer stator cores 84 are mutually staggered in a zigzag manner.

Since the function of the driving apparatus according to the second embodiment of the present invention is the same as that of the first embodiment of the present invention, the detailed description thereof will be omitted.

A washing machine driving apparatus according to a third embodiment of the present invention, may include a stator by using a number of split type cores, instead of an integral stator core according to the above-mentioned first and second embodiments of the present invention. In addition, the washing machine driving apparatus according to the third embodiment of the present invention is configured to have a stator core including inner teeth and outer teeth whose numbers are same.

Figure 6:
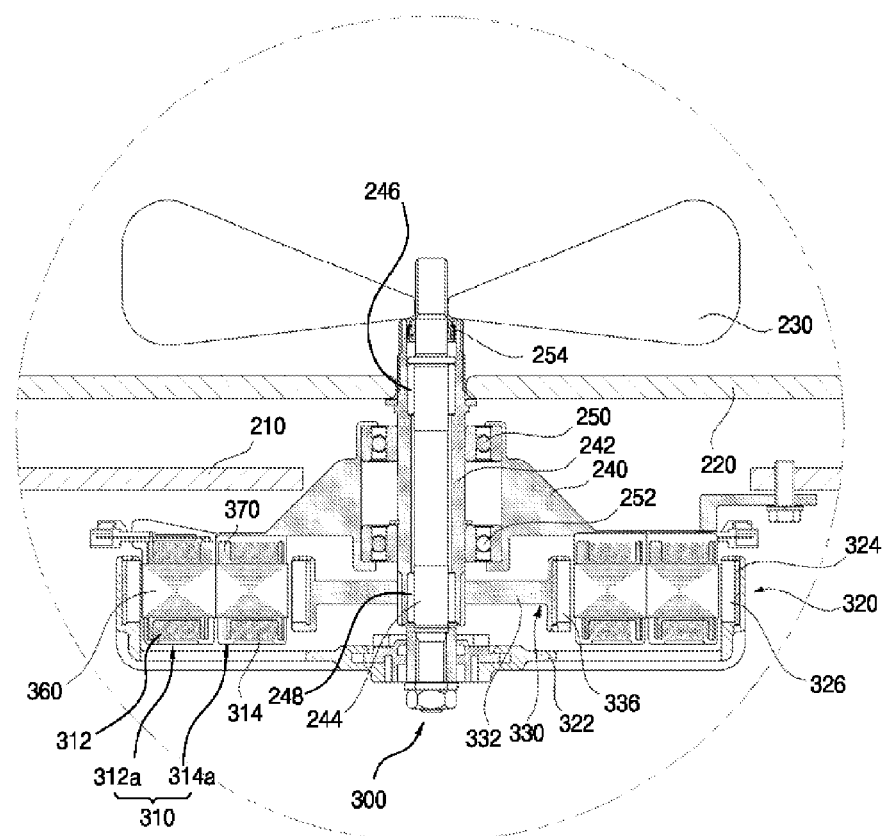
FIG. 6 is a cross-sectional view of a driving apparatus for a direct-drive type washing machine according a third embodiment of the present invention.
Figure 7:
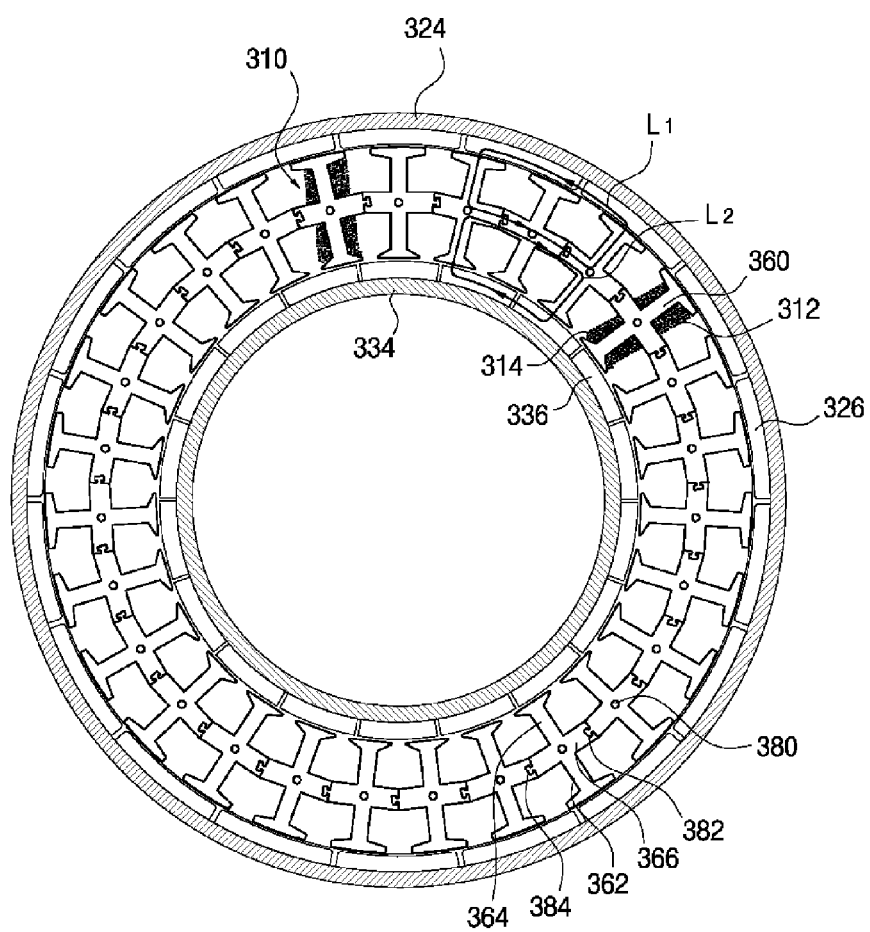
FIG. 7 is a plan view of a motor shown in FIG. 6.
Figure 8:
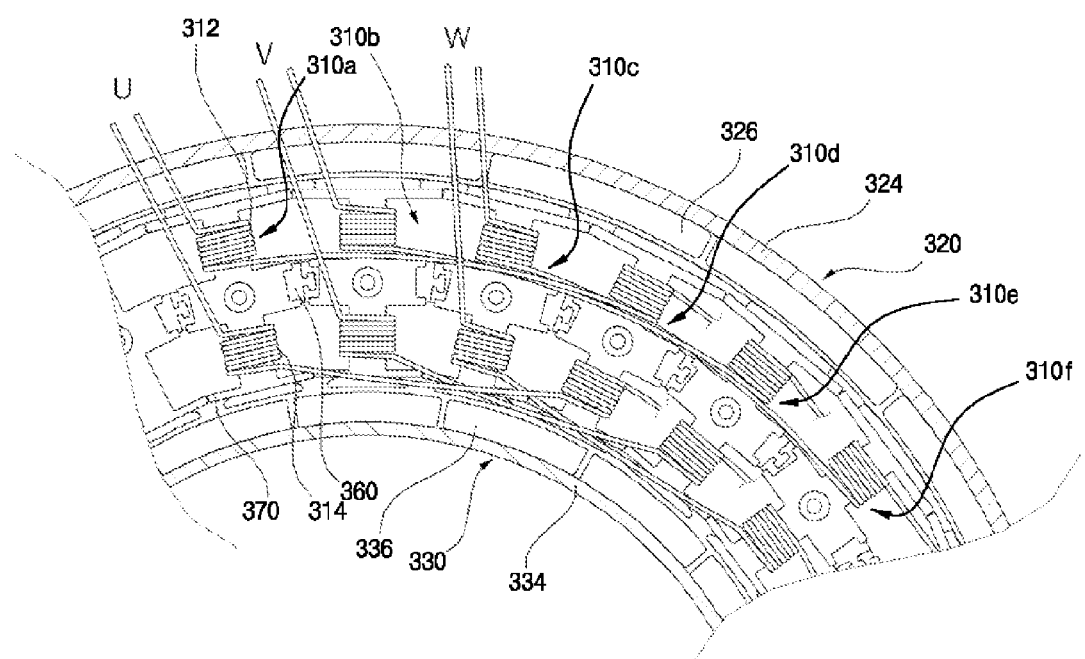
FIG. 8 is a plan view showing a method of winding coils on a double stator.

Referring to FIGS. 6 to 8, the washing machine driving apparatus according to the third embodiment of the present invention will be described below.

A washing machine according to the third embodiment of the present invention is configured to include: a case forming an external appearance; a washing tub 210 that is suspended and supported in the inside of the case and that accommodates water; a dehydrating tub 220 that is rotatably arranged in the inside of the washing tub 210, to perform washing and dehydration; a pulsator 230 that is rotatably placed in the dehydrating tub 220 to form a washing stream of water; and a motor 300 that is arranged on the lower portion of the washing tub 210 to drive the dehydrating tub 220 and the pulsator 230, simultaneously or selectively.

A support member 240 is fixed to the lower side of the washing tub 210. A dehydrating tub rotating shaft 242 that is connected to the dehydrating tub 220 to rotate the dehydrating tub 220 is rotatably supported on the support member 240. A pulsator rotating shaft 244 that is connected to a pulsator 230 to rotate the pulsator 230 is rotatably arranged in a concentrical structure, in the inside of the dehydrating tub rotating shaft 242.

The motor 300 includes: a double stator 310 that is fixed to the lower side of the washing tub 210; an outer rotor 320 that is arranged with an air gap on the outer surface of the double stator 310 and that is connected to the pulsator rotating shaft 244; and an inner rotor 330 that is arranged with an air gap on the inner surface of the double stator 310 and that is connected to the dehydrating tub rotating shaft 242.

The dehydrating tub rotating shaft 242 is formed to have a hollow shape. The top portion of the dehydrating tub rotating shaft 242 is fixed to the dehydration tub 220 and bearings 250 and 252 are disposed between the center of the dehydrating tub rotating shaft 242 and the support member 240. Accordingly, the dehydrating tub rotating shaft 242 is rotatably supported on the support member 240. The bottom of the dehydrating tub rotating shaft 242 is spline- or serration-coupled to the inner rotor 330. Accordingly, when the inner rotor 330 is rotated, the dehydrating tub rotating shaft 242 is rotated together.

The pulsator rotating shaft 244 is rotatably supported through a pair of sleeve bearings 246 and 248 in the inside of the dehydrating tub rotating shaft 242. The pulsator 230 is fixed to the top of the pulsator rotating shaft 244, and the bottom of the pulsator rotating shaft 244 is spline- or serration-coupled to the outer rotor 320. Accordingly, when the outer rotor 320 is rotated, the pulsator rotating shaft 244 is rotated together.

The pair of the sleeve bearings 246 and 248 are provided between the dehydrating tub rotating shaft 242 and the pulsator rotating shaft 244, at the upper and lower sides thereof, to thus rotatably support the pulsator rotating shaft 244. A sealing member 254 is provided at the leading end between the dehydrating tub rotating shaft 242 and the pulsator rotating shaft 244, to thereby prevent water filled in the inside of the dehydration tub 220 from leaking.

The outer rotor 320 includes: a first rotor support 322; a first back yoke 324 that is fixed to one side of the first rotor support 322; and a first magnet 326 that is mounted on the inner surface of a second back yoke 324 and that is arranged to face the double stator 310 with an air gap from an outer surface of the double stator 310.

The first back yoke 324 and the first magnet 326 are arranged in an annular form in a mold, and then the first rotor support 322 is integrally molded by an insert-molding method, to thus form the outer rotor 320.

One end of the first rotor support 322 is fixed to the first back yoke 324 and the first magnet 326, and the other end thereof is spline- or serration-coupled with the pulsator rotating shaft 244.

The inner rotor 330 includes: a second rotor support 332; a second annular back yoke 334 that is fixed to the outer surface of the second rotor support 332; and a second magnet 336 that is mounted on the outer surface of the second back yoke 334 and that is arranged to face the double stator 310 with an air gap from an inner surface of the double stator 310.

The second back yoke 334 and the second magnet 336 are arranged in a mold, and then the second rotor support 332 is integrally molded by an insert-molding method, to thus form the inner rotor 330.

The second rotor support 332 is formed in a circular plate shape whose center portion is opened. The outer end of the second rotor support 332 is fixed to the second back yoke 334 and the second magnet 336, and the inner end thereof is spline- or serration-coupled with the dehydrating tub rotating shaft 242.

As described above, the pulsator rotating shaft 244 is connected to the outer rotor 320, and thus when the outer rotor 320 is rotated, the pulsator rotating shaft 244 is rotated together with the outer rotor 320. The dehydrating tub rotating shaft 242 is connected to the inner rotor 330, and thus when the inner rotor 330 is rotated, the dehydrating tub rotating shaft 242 is rotated together with the inner rotor 330. Accordingly, the pulsator rotating shaft 244 and the dehydrating tub rotating shaft 242 can be rotated independently of each other and simultaneously.

The double stator 310 includes a number of split core assemblies 310a-310f on which the first coils 312 and the second coils 314 are wound.

Each of the split core assemblies 310a-310f includes: a split core 360; an insulating bobbin 370 that is wrapped by a circumferential surface of the split core 360; a first coil 312 that is wound on one side of the split core 360 and through which a first drive signal is applied; and a second coil 314 that is wound on the other side of the split core 360 and through which a second drive signal that is the same as or different from the first drive signal is applied.

Here, the first drive signal is applied to the first coil 312, and the second drive signal is applied to the second coil 314, and thus the rotational torques of the pulsator 230 and the dehydrating tub 220 can be designed to suit the rotating forces of the pulsator 230 and the dehydrating tub 220, to thereby improve the torque efficiency thereof.

As shown in FIG. 7, the split core 360 includes: an outer tooth 362 on which the first coil 312 is wound; an inner tooth 364 that is formed on the opposite side of the outer tooth 362, and on which the second coil 314 is wound; a compartment 366 that is partitioned between the outer tooth 362 and the inner tooth 364; and connection units 382 and 384 that are formed at both ends of the compartment 366 and that connect the adjoining split cores 360.

Then, a throughhole 380 is formed at the center of the split core 360, in order to combine a plurality of stacked split cores 360 between an upper fixing plate and a lower fixing plate with a bolt.

The adjoining split cores 360 are to have a mutually directly connected structure so as to form first and second magnetic circuits L1 and L2 in cooperation with the first magnet 326 of the outer rotor 320 and the second magnet 336 of the inner rotor 330. Thus, the adjoining split cores 360 are directly connected by means of the connection units 382 and 384.

As an example of the connection units 382 and 384, a coupling protrusion 384 is protrudingly formed at one side of the compartment 366, and a coupling groove 382 is recessedly formed at the other side of the compartment 366 so that the coupling protrusion 384 can be fitted into the coupling groove 382. A neck portion whose width narrows is formed in the coupling protrusion 384, so as to be caught at the entrance of the coupling groove 382.

Prior to winding the double stator 310, a plurality of split cores 360 are first stacked and then insert-molded, so that bobbins 370 are wrapped by a circumferential surface of the split cores 360.

Then, a coil winding process is carried out so that the first coil 312 is wound on the outer tooth 362 of the split core 360, and the second coil 314 is wound on the inner tooth 364 of the split core 360. As a result, the double stator 310 of the present invention is configured to include an outer stator 312a in which the first coil 312 is wound on the outer tooth 362 of the split core 360, and an inner stator 314a in which the second coil 314 is wound on the inner tooth 364 of the split core 360.

In addition, the outer stator 312a may be formed by winding the first coil 312 on the outer tooth 362 clockwise (CW), and the inner stator 314a may be formed by winding the second coil 314 on the inner tooth 364 counterclockwise (CCW).

In the case that the winding directions of the first coil 312 and the second coil 314 have been made against each other as described above, it is possible to rotate the dehydrating tub 220 in the direction opposite to that of the pulsator 230, at a washing or rinsing mode of the washing machine.

Also, in this case, it is necessary to individually mount Hall components necessary to detect the rotational positions of the outer rotor 320 and the inner rotor 330, in order to individually drive the first coil 312 with respect to the outer stator 312a and the second coil 314 with respect to the inner stator 314a.

Such a motor is configured to form a pair of magnetic circuits independent of each other in which the first magnetic circuit L1 is formed between the outer rotor 320 and one side of the double stator 310 on which the first coil 312 is wound (that is, the outer stator), and the second magnetic circuit L2 is formed between the inner rotor 330 and the other side of the double stator 310 on which the second coil 314 is wound (that is, the inner stator). Accordingly, a magnetic path becomes short, and thus magnetic resistance is reduced to thereby reduce a magnetic loss and improve the efficiency of the motor.

Specifically, the first magnetic circuit L1 passes through the first magnet 326 of N pole, the outer tooth 362 that is opposite to the first magnet 326 of N pole and on which the first coil 312 is wound, the outer portion of the compartment 366, the first magnet 326 of S pole adjacent to the first magnet 326 of N pole, and the first back yoke 324.

In addition, the second magnetic circuit L2 passes through the second magnet 336 of N pole, the inner tooth 364 that is opposite to the second magnet 336 of N pole and on which the second coil 314 is wound, the inner portion of the compartment 366, the second magnet 336 of S pole, and the second back yoke 334.

Hereinbelow, the motor drive unit that is used to drive the motor of a double rotor-double stator structure that is used in the third embodiment will be described.

Figure 9:
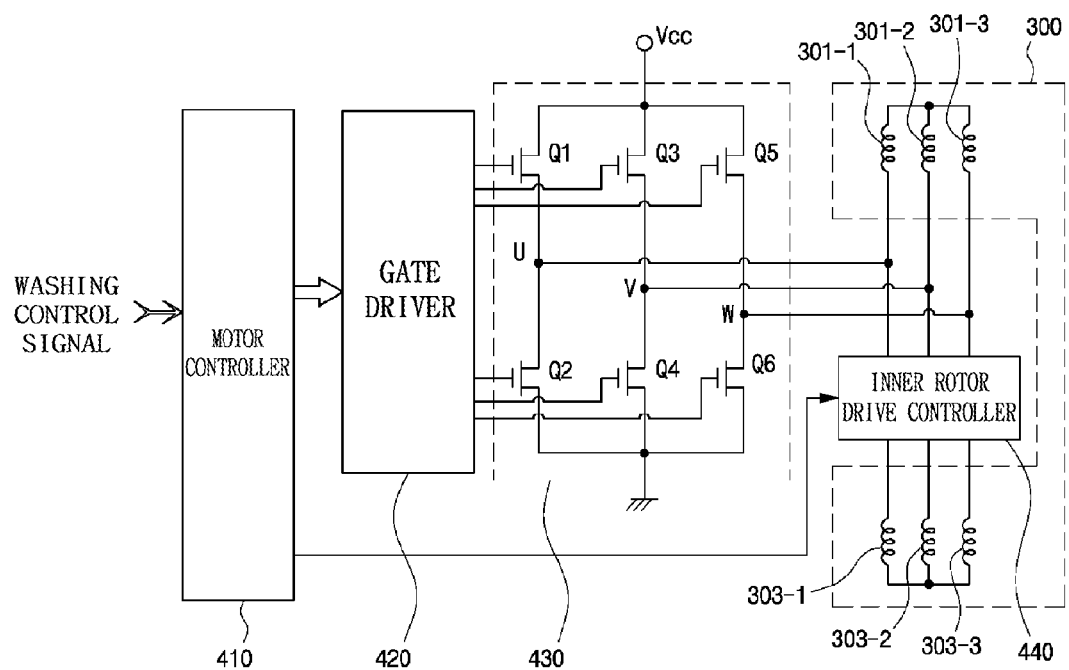
FIG. 9 is circuit diagram showing a motor drive unit according to a fourth embodiment of the present invention.

FIG. 9 is circuit diagram showing a motor drive unit according to a fourth embodiment of the present invention. The motor 300 of the double rotor-double stator structure that is used in the third embodiment shown in FIGS. 6 to 8 is driven in a 3-phase driving method.

To do this, the double stator 310 includes a plurality of split cores 360 having outer teeth 362 and inner teeth 364, respectively, in which the first coils 312 of three phases (U, V, W) are wound on a number of outer teeth 362 in sequence, and the second coils 314 of three phases (U, V, W) are wound on a number of inner teeth 364 in sequence.

The first coils 312 of three phases include first three-phase stator coils 301-1, 301-2, and 301-3, and the second coils 314 of three phases include second three-phase stator coils 303-1, 303-2, and 303-3.

When the three-phase AC power (that is, a first drive signal) is applied to the first three-phase stator coils 301-1, 301-2, and 301-3, the outer rotor 320 is rotated, and when the three-phase AC power (that is, a second drive signal) is applied to the second three-phase stator coils 303-1, 303-2, and 303-3, the inner rotor 330 is rotated.

Here, the pulsator rotating shaft 244 is connected to the outer rotor 320, and the dehydrating tub rotating shaft 242 is connected to the inner rotor 330.

Then, since the three-phase AC power is applied to the first three-phase stator coils 301-1, 301-2, and 301-3, the outer rotor 320 is rotated to make the pulsator 230 rotated. In addition, since the three-phase AC power is applied to the second three-phase stator coils 303-1, 303-2, and 303-3, the inner rotor 330 is rotated to make the dehydrating tub 220 rotated.

A reference numeral 410 denotes a motor controller. The motor controller 410 generates drive signals for driving the motor 300 for the washing machine according to control signals such as washing, rinsing and dehydrating control signals that are input from an external washing machine controller (not shown).

For example, the motor controller 410 generates a PWM (Pulse Width Modulation) drive signal for the washing machine motor 300.

A reference numeral 420 denotes a gate driver. The gate driver 420 amplifies a voltage level of the drive signal generated by the motor controller 410 into a sufficient level.

A reference numeral 430 denotes an inverter. The inverter 430 includes three pairs of switching devices Q1 and Q2; Q3 and Q4; and Q5 and Q6 that switch DC power of a power supply terminal (Vcc) according to the drive signal that has been amplified to have the sufficient voltage level by the gate driver 420. The three pairs of switching devices Q1 and Q2; Q3 and Q4; and Q5 and Q6 are divided into upper switching devices Q1, Q3, and Q5 and lower switching devices Q2, Q4, and Q6, which are connected in a totem pole structure, respectively.

In addition, the three-phase AC power of U-phase, V-phase and W-phase is generated from junctions U, V, and W of the three pairs of switching devices Q1 and Q2; Q3 and Q4; and Q5 and Q6, and the generated three-phase AC power is output to the first three-phase stator coils 301-1, 301-2, and 301-3, and the second three-phase stator coils 303-1, 303-2, and 303-3.

A reference numeral 440 denotes an inner rotor drive controller. The inner rotor drive controller 440 is disposed between the inverter 130 and the second three-phase stator coils 303-1, 303-2, and 303-3 of the washing machine motor 300.

In addition, the inner rotor drive controller 440 controls the three-phase AC power generated from the inverter 430 to be applied to or blocked to the second three-phase stator coils 303-1, 303-2, and 303-3, under the control of the motor controller 410, to thus make the inner rotor 330 rotated or stopped.

It is preferable that the three-phase AC power is applied to the first three-phase stator coils 301-1, 301-2, and 301-3 in order to rotate the outer rotor 320 connected with the pulsator rotating shaft 244 and the dehydrating tub 220 is in a stationary state, or is rotated in the opposite direction to that of the pulsator 230, when the washing machine works at a washing or rinsing mode.

In this case, if the dehydrating tub 220 is rotated in an identical direction by forces of water currents at the time of rotation of the pulsator 230, a phenomenon of weakening a washing strength occurs.

Therefore, it is preferable that the dehydrating tub 220 is rotated in the opposite direction to that of the pulsator 230, in order to prevent this phenomenon of weakening a washing strength and to reinforce the washing strength. For this purpose, in the case that the double stator 310 is configured by winding the first coil 312 of the outer stator 312*a* and the second coil 314 of the inner stator 314*a* in opposite directions, in the present invention, if the three-phase AC power is applied to both the first three-phase stator coils 301-1, 301-2, and 301-3 and the second three-phase stator coils 303-1, 303-2, and 303-3 simultaneously, it is possible to rotate the dehydrating tub in the opposite direction to the rotating direction of the pulsator.

In addition, when the washing machine works at a dehydrating mode, the three-phase AC power is applied to the second three-phase stator coils 303-1, 303-2, and 303-3, so as to rotate the inner rotor 330 connected to the dehydrating tub rotating shaft 242, or the three-phase AC power is applied to both the first three-phase stator coils 301-1, 301-2, and 301-3 and the second three-phase stator coils 303-1, 303-2, and 303-3 simultaneously, so as to desirably rotate both the dehydrating tub 220 and the pulsator 230 in an identical direction.

In the case that laundry is washed through the driving apparatus for driving the motor for use in the washing machine having this configuration of the present invention, the motor controller 410 generates a PWM drive signal according to an externally input washing control signal, and the generated PWM drive signal is amplified through the gate driver 420, to then be applied to one of the gates of switching devices Q1 to Q6 constituting the inverter 430.

In this case, the inverter 430 is configured so that the PWM drive signal is applied to one gate of the upper switching devices Q1, Q3, and Q5, and one gate of the lower switching devices Q2, Q4, and Q6, according to detection of the rotor position of the hall sensor. In this case, the inverter 430 can be driven in a way that the lower switching device Q6 of W-phase is turned on, that is, in a 6-step manner, in the case that the upper switching device Q1 of U-phase among the upper switching devices Q1, Q3, and Q5 when a phase is 0° according to detection of the rotor position of the hall sensor.

In addition, the PWM drive signals applied to the gates of the upper switching devices Q1, Q3, and Q5 have a phase difference of 120° or 180° with respect to each other.

Therefore, the switching devices Q1 to Q6 of the inverter 430 are turned on and turned off alternately, in accordance with the PWM drive signal amplified in the gate driver 420, to thus switch the DC power of the power supply terminal (Vcc). Accordingly, the three-phase AC power is generated from the junctions U, V, and W to then be output to the motor 300 for driving the washing machine.

Since the three-phase AC power output from the inverter 430 is directly applied to the first three-phase stator coils 301-1, 301-2, and 301-3, and in the case that the first three-phase stator coils 301-1, 301-2, and 301-3 are excited, the motor 300 for driving the washing machine rotates the outer rotor 320 constituting the first magnetic circuit L1 to thereby rotate the pulsator 230.

In this case, the three-phase AC power is applied or blocked to the second three-phase stator coils 303-1, 303-2, and 303-3, under the control of the motor controller. In other words, in the case that the motor controller 410 controls the inner rotor drive controller 440 to block the three-phase AC power, the three-phase AC power is not applied to the second three-phase stator coils 303-1, 303-2, and 303-3 and thus the inner rotor 330 does not rotate. The dehydrating tub rotating shaft 242 connected to the inner rotor 330 and the dehydrating tub 220 connected to the dehydrating tub rotating shaft 242 do not rotate.

In addition, in the case that the motor controller 410 controls the inner rotor drive controller 440 to thus make the three-phase AC power pass, the three-phase AC power is applied to the second three-phase stator coils 303-1, 303-2, and 303-3 to thus make the inner rotor 330 rotated, and the dehydrating tub rotating shaft 242 that is connected to the inner rotor 330 and the dehydrating tub 220 that is connected to the dehydrating tub rotating shaft 242 are rotated.

In this case, the motor controller 410 controls the inner rotor controller 440 to thus change an output end through which the three-phase AC power is output, and to thereby change the rotating direction of the inner rotor 330.

Figure 10:
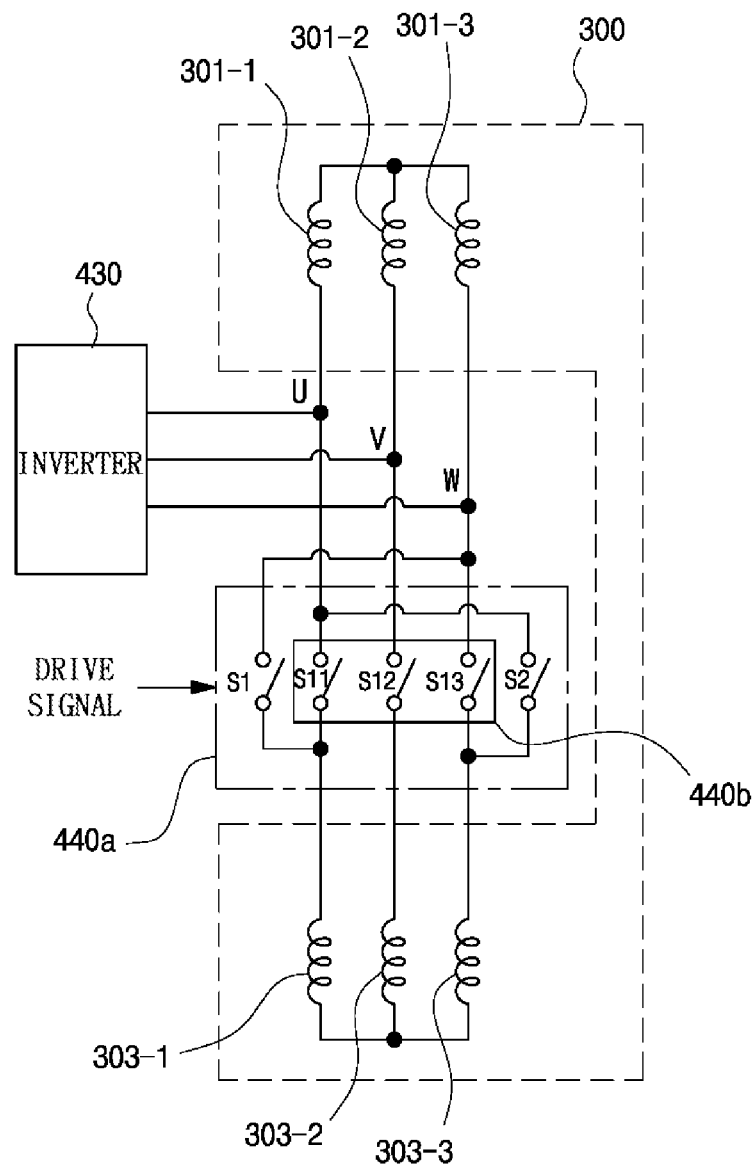
FIG. 10 is circuit diagram showing a motor drive unit according to a fifth embodiment of the present invention.

To this end, an inner rotor drive controller 440*a* according to a fifth embodiment of the present invention shown in FIG. 10, includes a main connection unit 440*b* formed of three switches S11-S13 so that the U-phase, V-phase, and W-phase AC power is respectively applied or blocked to the second three-phase stator coils 303-1, 303-2, and 303-3, and further includes two auxiliary connection units S1 and S2 that change the U-phase and W-phase AC power so that the U-phase AC power is applied to the W-phase output and the W-phase AC power is applied to the U-phase output. In this case, the main and auxiliary connection units 440*b*, S1, and S2 may be a switch, a relay or a switching circuit, respectively.

In this case, the inverter 130, when the three switches S11-S13 of the main connection unit 440*b* are closed so that the U-phase, V-phase and W-phase AC power output from of the inverter 130 is applied to the second three-phase stator coils 303-1, 303-2, and 303-3, respectively, the inner rotor 330 is rotated in the forward direction.

When the inner rotor 330 is rotated in the reverse direction, the U-phase and W-phase switches S11 and S13 of the main connection unit 440*b* are opened, and instead the V-phase switch S12 and the secondary connection units S1 and S2 are closed, to thus change a path of the applied AC power.

Under these conditions, when the U-phase, V-phase and W-phase AC power is applied to the second three-phase stator coils 303-1, 303-2, and 303-3, respectively, the path of the applied AC power is changed, and thus the inner rotor 330 is rotated in the reverse direction.

Thus, the motor controller 410 controls the inner rotor controller 440, so that the inner rotor 330 is not rotated, the inner rotor 330 is rotated in the same direction as that of the outer rotor 320, or the inner rotor 330 is rotated in the direction opposite to that of the outer rotor 320.

In other words, the motor controller 410 controls the dehydrating tub 220 whose rotating shaft is connected to the inner rotor 330 so as not to be rotated, the dehydrating tub 220 to be rotated in the same direction as that of the pulsator 230, or the dehydrating tub 220 to be rotated in the direction opposite to that of the pulsator 230.

Therefore, in the case that washing and rinsing actions are performed in the present invention, while the pulsator 230 is rotated, the inner rotor 330 is stopped, so that the dehydrating tub 220 is not rotated, or the dehydrating tub 220 is rotated in the same direction as or in the reverse direction to that of the pulsator 230, to thus improve the washing efficiency. As a way to make the inner rotor 330 stop to thus prevent the dehydrating tub 220 from rotating, it is possible to configure the second three-phase stator coils 303-1, 303-2, and 303-3 to be shorted to make a short circuit occur under the control of the inner rotor drive controller 440.

In addition, when the dehydration operation is performed in the present invention, the motor controller 410 controls the inner rotor controller 440, to thus make the dehydrating tub 220 rotated in the same direction as that of the pulsator 230, and to thereby improve the dehydrating efficiency.

In this case, the inner rotor drive controller 440 may be configured to have three switches, three relays, or three switching circuits, respectively, so that the U-phase, V-phase and W-phase AC power is applied or blocked to the second three-phase stator coils 303-1, 303-2, and 303-3.

In the fifth embodiment described above, in the case that the washing or rinsing mode is performed, the auxiliary connection units S1 and S2 for changing the paths of the U-phase and W-phase except for V-phase of the main connection unit 440b have been illustrated, but any changes or variations may be acceptable if the paths of the remaining two phases are changed except for one path among the main connection unit 440b where the three-phase AC power is applied to the second stator coils under the control of the motor controller 410.

Figure 11:
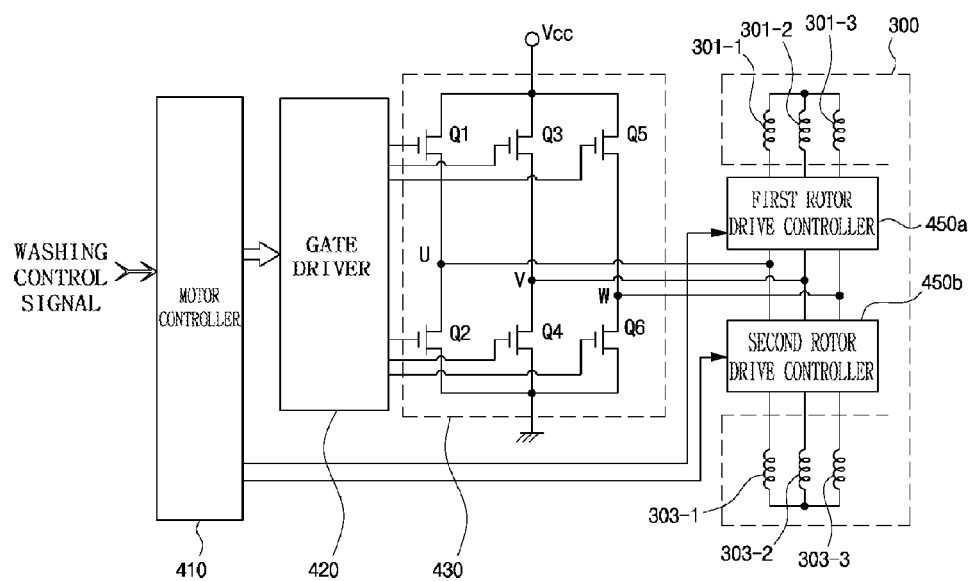
FIG. 11 is circuit diagram showing a motor drive unit according to a sixth embodiment of the present invention.

FIG. 11 is circuit diagram showing a motor drive unit for use in a washing machine according to a sixth embodiment of the present invention.

Referring to FIG. 11, a motor drive unit for use in a washing machine according to a sixth embodiment of the present invention, differs from that of the fourth embodiment illustrated in FIG. 9, in the fact that first and second rotor drive controllers 450a and 450b are respectively provided between the first three-phase stator coils 301-1, 301-2, and 301-3 and the second three-phase stator coils 303-1, 303-2, and 303-3, from the three-phase AC power from the inverter 430. However, since the remaining components of FIG. 11 are the same as those of FIG. 9. In FIG. 11, the same reference numerals have been assigned to the same components as those of FIG. 9.

The first and second rotor drive controller 450a and 450b play a role of applying or blocking the three-phase AC power from the inverter 430 to the first three-phase stator coils 301-1, 301-2, and 301-3 and the second three-phase stator coils 303-1, 303-2, and 303-3, according to an application of a control signal of the motor controller 410.

The first and second rotor drive controller 450a and 450b may be configured to include three switches, three relays, or three switching circuits, respectively, so that the U-phase, V-phase and W-phase AC power is applied or blocked to the first three-phase stator coils 301-1, 301-2, and 301-3 and the second three-phase stator coils 303-1, 303-2, and 303-3.

In the case that the motor drive unit for use in a washing machine according to the sixth embodiment of the present invention is used, the first coils 312 of the outer stator 312a and the second coils 314 of the inner stator 314a are wound in opposite directions to each other, to thus configure a double stator 310. Here, when the first and second rotor drive controllers 450a and 450b are controlled to apply the three-phase AC power to both the first three-phase stator coils 301-1, 301-2, and 301-3 and the second three-phase stator coils 303-1, 303-2, and 303-3, it is possible to rotate the dehydrating tub 220 in the direction opposite to that of the pulsator 230.

Therefore, at the washing and rinsing modes, the dehydrating tub 220 may be rotated in the direction opposite to that of the pulsator 230, or the first rotor drive controller 450a may be controlled so that the washing and rinsing modes can be carried out with only the pulsator 230.

In addition, when the washing machine is in the dehydrating mode, all switches of the first rotor drive controller 450a are opened, and the second rotor drive controller 450b is controlled to thereby rotate the inner rotor 330 to which the dehydrating tub rotating shaft 242 is connected and thus enable only the dehydrating tub 220 to be driven.

In addition, in the sixth embodiment, the first and second rotor drive controllers 450a and 450b are basically configured to include three switches, three relays, or three switching circuits, respectively, so as to apply or block the three-phase AC power. However, in the same manner as that of the fifth embodiment shown in FIG. 10, the first and second rotor drive controllers 450a and 450b may be configured to include switching circuits that apply or block the three-phase AC power to the three-phase stator coils, as well as change paths of application of the three-phase AC power.

The motor controller 410 can easily select the rotating directions of the outer and inner rotors 320 and 330 in a variety of ways, to thereby accomplish a design of an effective washing course at the washing and rinsing modes.

In the above description of the embodiments, it has been described with respect to driving of the motor of a double-rotor-double-stator structure by using a single motor drive unit, but the first and second stator coils are selectively controlled by using two motor drive units, so as to selectively drive the outer rotor and the inner rotor.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention may be applied to a washing machine, as a direct-drive type driving apparatus that drives the washing machine. In addition, the present invention may be applied to a variety of types of washing machines in which a pulsator and a dehydrating tub are rotated. Further, the present invention may be applied to a drum-type washing machine through simple changes of the structure in addition to an upright washing machine.

What is claimed are:

1. A driving apparatus for a direct-drive type washing machine, the driving apparatus comprising:
    a support member that is fixed to a lower side of a washing tub;
    a dehydrating tub rotating shaft that is rotatably supported on the support member and that is connected to a dehydrating tub to rotate the dehydrating tub, the dehydrating tub being arranged inside the washing tub;
    a pulsator rotating shaft that is rotatably arranged inside the dehydrating tub rotating shaft and that is connected to a pulsator to rotate the pulsator, the pulsator being arranged inside the dehydrating tub;
    a drive motor comprising a double rotor including an outer rotor that is connected to the pulsator rotating shaft and an inner rotor that is connected to the dehydrating tub rotating shaft, and a double stator including a first stator coil for rotating the outer rotor and a second stator coil for rotating the inner rotor;
    a single inverter that generates a three-phase alternating-current (AC) power to be applied to the first stator coil and the second stator coil; and
    a first rotor drive controller provided between the single inverter and the second stator coil, wherein the first rotor drive controller is configured to block or pass the three-phase AC power being applied to the second stator coil under control of a motor controller, to thus control driving of the inner rotor;
    a second rotor drive controller that is provided between the single inverter and the first stator coil, and that is configured to block or pass an application of the three-phase AC power to the first stator coil under the control of the motor controller, to thus control driving of the outer rotor,
    wherein the first rotor drive controller is further configured to change direction of rotation of the inner rotor in case of performing a washing or rinsing mode, so that the inner rotor rotates in opposite direction to that of the outer rotor.

2. The driving apparatus according to claim 1, wherein the first rotor drive controller comprises:
    three main switches that are respectively provided between the three-phase AC power and the second stator coil, and that block or pass the three-phase AC power under the control of the motor controller; and
    two auxiliary connection units that alter paths of two phases of the three-phase AC power being applied to the second stator coil, to thereby alter a rotating direction of the inner rotor.

3. The driving apparatus according to claim 1, wherein the first rotor drive controller is further configured to pass one phase of the three-phase AC power that is applied to the second stator coil and to alter paths of the other two phases of the three-phase AC power in case of performing a washing or rinsing mode.

4. The driving apparatus according to claim 1, wherein the double stator comprises:
    a stator core having a plurality of inner teeth formed inwards, and a plurality of outer teeth formed outwards;
    the first stator coil wound around the outer teeth; and
    the second stator coil wound around the inner teeth.

5. The driving apparatus according to claim 4, wherein the stator core comprises:
    a ring-shaped body that is formed in a ring shape;
    the inner teeth that are radially formed on an inner surface of the body; and
    the outer teeth that are radially formed on an outer surface of the body.

6. The driving apparatus according to claim 1, wherein the double stator comprises:
    a plurality of split cores that are assembled in an annular form, and each split core having outer teeth formed outwards and inner teeth formed inwards;
    a plurality of insulator bobbins that surround outer surfaces of the plurality of split cores, respectively;
    the first stator coil that is wound on the outer teeth; and
    the second stator coil that is wound on the inner teeth.

* * * * *